(12) United States Patent
Webber et al.

(10) Patent No.: US 9,360,123 B2
(45) Date of Patent: *Jun. 7, 2016

(54) VALVE

(71) Applicants: Andrew Webber, Cypress, TX (US); Drayton W. Bryant, Houston, TX (US)

(72) Inventors: Andrew Webber, Cypress, TX (US); Drayton W. Bryant, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 271 days.

This patent is subject to a terminal disclaimer.

(21) Appl. No.: 14/018,917

(22) Filed: Sep. 5, 2013

(65) Prior Publication Data

US 2014/0166919 A1   Jun. 19, 2014

Related U.S. Application Data

(63) Continuation-in-part of application No. 13/465,484, filed on May 7, 2012, now Pat. No. 8,876,083.

(51) Int. Cl.
  *F16K 3/26* (2006.01)
  *E21B 33/00* (2006.01)
  *E21B 34/00* (2006.01)

(52) U.S. Cl.
  CPC . *F16K 3/26* (2013.01); *F16K 3/265* (2013.01); *E21B 2033/005* (2013.01); *E21B 2034/007* (2013.01)

(58) Field of Classification Search
  CPC ......... E21B 34/00; E21B 34/06; E21B 34/12; E21B 34/14; E21B 2033/005; E21B 33/1208; E21B 2034/007; F16K 3/26; F16K 3/262; F16K 3/265

USPC ............... 251/343, 344, 326, 297; 166/332.1, 166/334.1, 334.4, 386, 316, 320, 373; 137/625.68

See application file for complete search history.

(56) References Cited

U.S. PATENT DOCUMENTS

| | | | |
|---|---|---|---|
| 3,744,523 A | | 7/1973 | Hill |
| 3,871,616 A | | 3/1975 | Taylor |
| 3,926,409 A | | 12/1975 | Abney et al. |
| 4,522,373 A | | 6/1985 | Shelbourn et al. |
| 4,616,718 A | | 10/1986 | Gambertoglio |
| 5,316,084 A | | 5/1994 | Murray et al. |
| 6,230,811 B1 * | | 5/2001 | Ringgenberg et al. ........ 166/374 |

(Continued)

OTHER PUBLICATIONS

PCT International Search Report and Written Opinion; PCT/US2013/035438; Korean Intellectual Property Office; Mailed Jun. 21, 2013; 7 pages.

*Primary Examiner* — William McCalister
*Assistant Examiner* — Ian Paquette
(74) *Attorney, Agent, or Firm* — Cantor Colburn LLP

(57) ABSTRACT

Disclosed herein is a valve. The valve includes a first member having a first port therethrough, a second member in operable communication with the first member having a sealing surface thereon on an inner radial surface of the second member and a second port therethrough that is movable relative to the first member. The valve also has a seal sealingly engaged with the first member and slidably sealingly engagable with the second member, and a support member movably disposed relative to the first member and the second member. The support member has a support surface dimensioned similarly to the sealing surface, and is movable with the second member relative to the first member so that upon such movement the seal is continuously supported by at least one of the sealing surface and the support surface.

10 Claims, 6 Drawing Sheets

(56) References Cited

U.S. PATENT DOCUMENTS

| | | |
|---|---|---|
| 6,722,439 B2 | 4/2004 | Garay et al. |
| 6,817,416 B2 | 11/2004 | Wilson et al. |
| 7,363,981 B2 | 4/2008 | Coon et al. |
| 8,800,655 B1 * | 8/2014 | Bailey .......................... 166/289 |
| 8,876,083 B2 * | 11/2014 | Black et al. ................... 251/344 |
| 2005/0139362 A1 | 6/2005 | Coon et al. |
| 2005/0284642 A1 | 12/2005 | Wong |
| 2007/0089887 A1 | 4/2007 | Gomez |
| 2009/0044944 A1 | 2/2009 | Murray et al. |
| 2009/0139726 A1 * | 6/2009 | Gomez .......................... 166/373 |
| 2011/0278016 A1 * | 11/2011 | Xu ................................ 166/373 |
| 2011/0284232 A1 * | 11/2011 | Huang .......................... 166/317 |

* cited by examiner

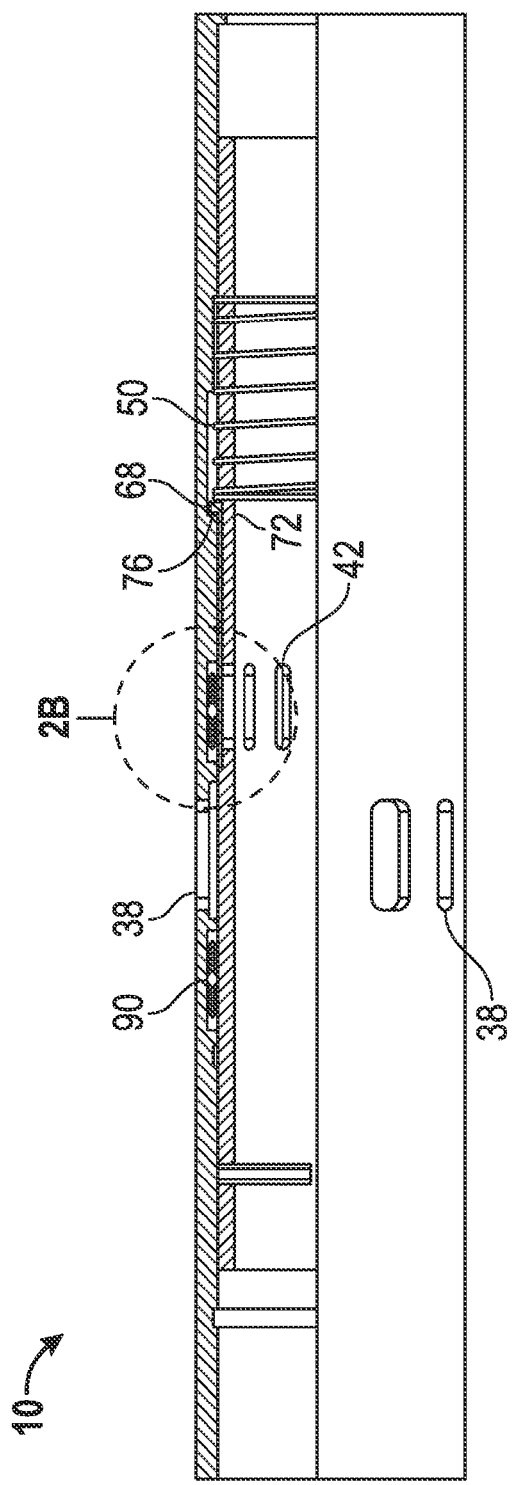
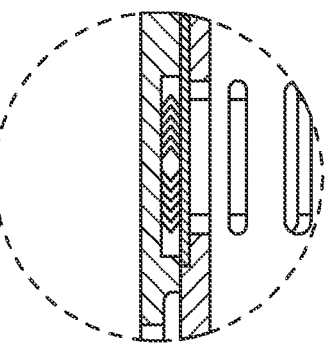
FIG. 2A
FIG. 2B

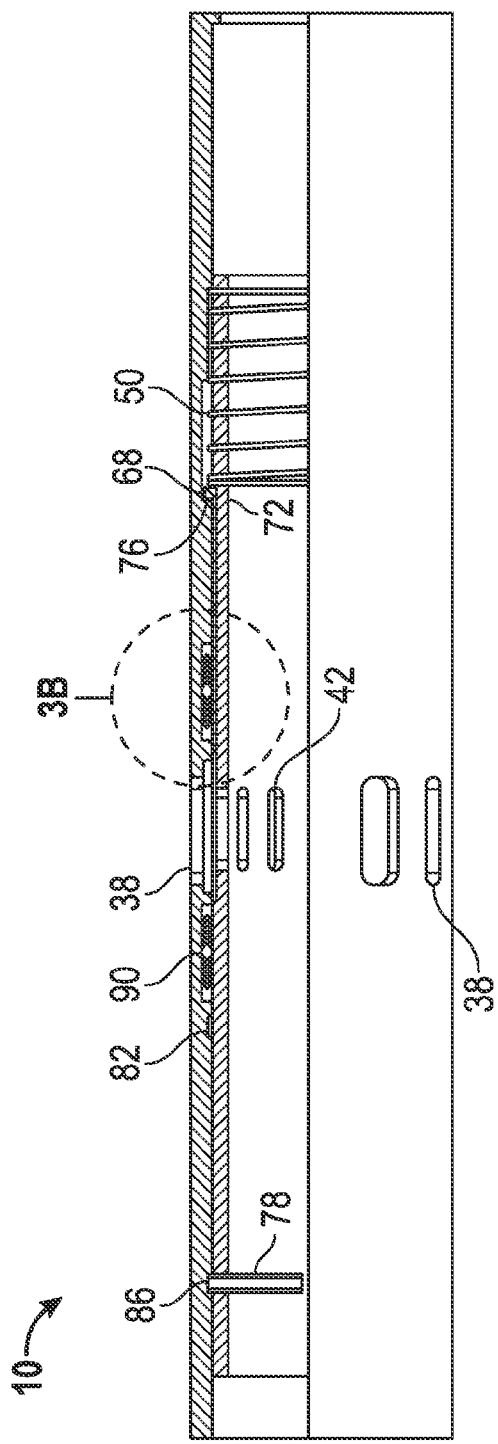
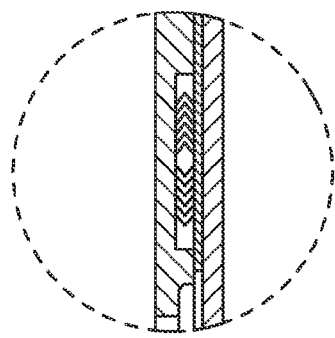
FIG. 3A
FIG. 3B

VALVE

BACKGROUND

Valving systems such as tubular valving systems, for example, typically employ seals that are slidably sealingly engaged via radial compression in an annular space defined between movable nested tubulars. When closed ports in the two tubulars are positioned on opposing longitudinal sides of the seal and when open are positioned on a same longitudinal side of the seal. Actuation of such valves simply requires longitudinally sliding one tubular relative to the other such that the ports of one of the two tubulars pass by the seal. The seals can however, be damaged upon such movement since the radial compression of the seal is at least momentarily removed when the port is aligned with the seal. Once the end of the port reaches the seal the seal must be recompressed. This recompression sometimes results in the seal being cut. Additionally, flow by the seal while the seal is uncompressed can dislodge or extrude the seal from a recess designed to position the seal. This can result in leakage upon closure of the valve. Operators of tubular valves are always interested in new devices that avoid the foregoing drawbacks.

BRIEF DESCRIPTION

Disclosed herein is a valve. The valve includes a first member having a first port therethrough, a second member in operable communication with the first member having a sealing surface thereon on an inner radial surface of the second member and a second port therethrough that is movable relative to the first member. The valve also has a seal sealingly engaged with the first member and slidably sealingly engagable with the second member, and a support member movably disposed relative to the first member and the second member. The support member has a support surface dimensioned similarly to the sealing surface, and is movable with the second member relative to the first member so that upon such movement the seal is continuously supported by at least one of the sealing surface and the support surface.

Further disclosed herein is a valve. The valve includes, a first member having a first port therethrough, a second member in operable communication with the first member having a sealing surface thereon and a second port therethrough that is movable relative to the first member, a seal sealingly engaged with the first member and slidably sealingly engagable with the second member, and a support member movably disposed relative to the first member and the second member having a support surface dimensioned similarly to the sealing surface. The support member is movable with the second member relative to the first member so that upon movement of the second member relative to the first member the seal is continuously supported by at least one of the sealing surface and the support surface, and at least one of an end of the support surface and a shoulder of the sealing surface has a chamfer or radius thereon.

Further disclosed herein is a valve. The valve includes, a first tubular having a first port and sealingly slidably surrounding a second tubular having a second port, the first tubular having a sealing surface on a first inner radial surface, a sleeve positioned within an annular space defined between the first tubular and the second tubular being movable relative to the first tubular and the second tubular, the sleeve having a second inner radial surface dimensioned similarly to the first inner radial surface, and a seal sealably engaged with the second tubular and slidably sealably engagable with the sealing surface, the seal being movable relative to the first tubular and the sleeve by movement of the second tubular relative to the first tubular and the sleeve such that the seal is at least sealably engaged with the first surface or support by the second inner radial surface at all locations of the second tubular relative to the first tubular and the sleeve.

BRIEF DESCRIPTION OF THE DRAWINGS

The following descriptions should not be considered limiting in any way. With reference to the accompanying drawings, like elements are numbered alike:

FIG. 2A depicts a partial cross sectional view of the valve disclosed herein shown in an alternate closed position;

FIG. 2B depicts a magnified view of a portion of the valve of FIG. 2A taken at circle 2B;

FIG. 3A depicts a partial cross sectional view of the valve disclosed herein shown in an open position;

FIG. 3B depicts a magnified view of a portion of the valve of FIG. 3A taken at circle 3B;

DETAILED DESCRIPTION

A detailed description of one or more embodiments of the disclosed apparatus is presented herein by way of exemplification and not limitation with reference to the Figures.

Figure 1A:
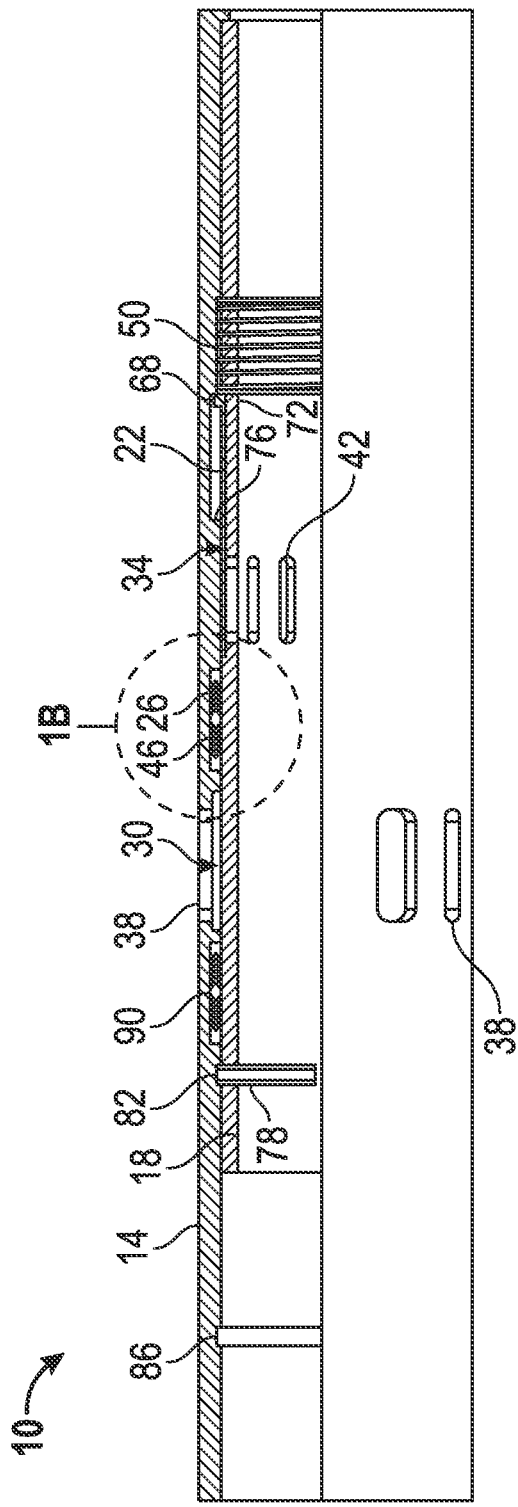
FIG. 1A depicts a partial cross sectional view of a valve disclosed herein shown in a closed position.
Figure 1B:
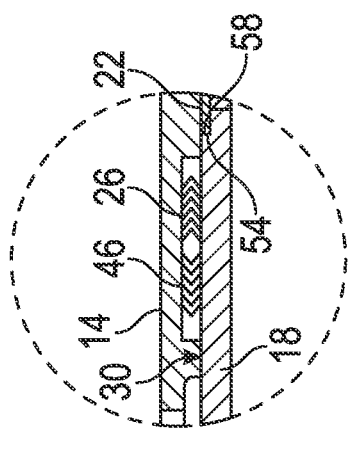
FIG. 1B depicts a magnified view of a portion of the valve of FIG. 1A taken at circle 1B.

Referring to FIGS. 1A-3B, an embodiment of a valve disclosed herein as a tubular valve is illustrated at 10. The valve 10 includes a first member 14, a second member 18 movable relative to the first member 14 and a support member 22 movable relative to both the first member 14 and the second member 18. The first member 14 and the second member 18 both being tubulars in this embodiment, and the support member 22 being a sleeve. A seal 26 is sealingly engaged with the first tubular 14 and slidably sealingly engaged with a sealing surface 30 of the second tubular 18. The valve 10 is configured such that when moving from a closed position, as shown in FIG. 1A, to an open position, as shown in FIG. 3A, a support surface 34 of the sleeve 22 first moves into supporting engagement with the seal 26, as shown in FIG. 2A, prior to the valve 10 opening. The foregoing structure assures that the seal 26 is always supported by either the sealing surface 30 or the support surface 34 at all possible positions of the tubulars 14, 18 and the sleeve 22. This differs from typical tubular valves that do not include the sleeve 22 and as such the seal 26 is unsupported during actuation of the valve thereby permitting fluid flow to possibly erode the seal 22 or to dislodge it from its seating position with the first tubular 14. Additional damage can occur to the seal 26 of such valves while being actuated due to clipping a portion of the seal 26 between the tubulars 14, 18 as the seal 22 reengages with sealing surface 30 after being unsupported. It should be noted that the support surface 34 is dimensioned substantially the same as the sealing surface 30 to minimize any changes in radial compression of the seal 26 as the sleeve 22 and the second tubular 18 move into and out of engagement with the seal 26. In fact, the seal 26 may sealingly engage with the support surface 34 upon engagement therewith.

The open versus closed position of the instant valve 10 is determined by the relative longitudinal positions of a first port 38 in the first tubular 14 and a second port 42 in the second tubular 18 relative to the seal 26. The closed position (FIG. 1A) is defined by the second port 42 being on an opposite side of the seal 26 than the first port 38, while the open position (FIG. 3A) is defined by the second port 42 being on a same side of the seal 26 as the first port 38. The open position allows fluidic communication between an inside and outside of the tubulars 14, 18.

The seal 26 may be constructed of various materials and have various shapes with the seal 26 illustrated in this illustrated embodiment being polymeric with a plurality of chevron elements 46 that are radially compressed between the first tubular 14 and either the sealing surface 30 or the support surface 34 depending on the instant position of the valve 10. The chevron shaped elements 46 provide increasing sealing forces when pressure is greater on one side than the other. By having some of the chevron shaped elements 46 oriented in each of two opposing longitudinal directions the seal 26 supports greater pressure in both directions than if the chevron shaped elements 46 were oriented in only a single longitudinal direction.

The sleeve 22 is longitudinally biased between the first tubular 14 and the second tubular 18 by a biasing member 50 illustrated herein as a compression spring. This biasing assures that an end 54 of the sleeve 22 remains in contact with a shoulder 58 of the second tubular 18 whenever the sleeve 22 is moving relative to the seal 26. This contact prevents a longitudinal gap from forming between the end 54 and the shoulder 58 that portions of the seal 26 could extend radially into if it were allowed to form.

A shoulder 68 on a second end 72 of the sleeve 22 is contactable with a shoulder 76 on the first tubular 14 to stop movement of the sleeve 22 relative to the first tubular 14 during opening of the valve 10. This allows the second port 42 to become uncovered by the sleeve 22 as the second tubular 18 moves to position the second port 42 on a same side of the seal 26 as the first port 38.

Two detents are formed between the first tubular 14 and the second tubular 18 by a snap ring 78 that move with the second tubular 18 into grooves 82, 86 on the second tubular 18. The grooves 82, 86 are positioned to maintain the valve 10 in the closed position when the snap ring 78 is located in the first groove 82 and the open position when the snap ring 78 is located in the second groove 86.

The valve 10 disclosed in this embodiments includes a second seal 90 that sealingly engages with both the first tubular 14 and the second tubular 18 throughout all movements thereof. The second seal 90 prevents leakage between the tubulars 14, 18 in a longitudinal direction opposite the direction of the first port 38 where the seal 22 is located. Alternate embodiments could employ other means than the sliding second seal 90 shown, such as a flexible bellows member (not shown), for example, that would allow the tubulars 14, 18 to move relative to one another while maintaining a seal therebetween.

The tubular valve 10 disclosed herein is employable in any tubular system. For example, the valve 10 could be employed downhole in a borehole of a carbon sequestration operation, in a wellbore of a hydrocarbon recovery operation and in a wellbore of a water well operation, to name a few. These examples often employ very high pressures and flow rates that can be detrimental to seals of typical valves that are unsupported for even short durations of time while such valves are actuated. By employing the disclosed valve 10 in these applications, even higher pressures and flow rates than those currently allowed will likely be achievable.

Figure 4A:
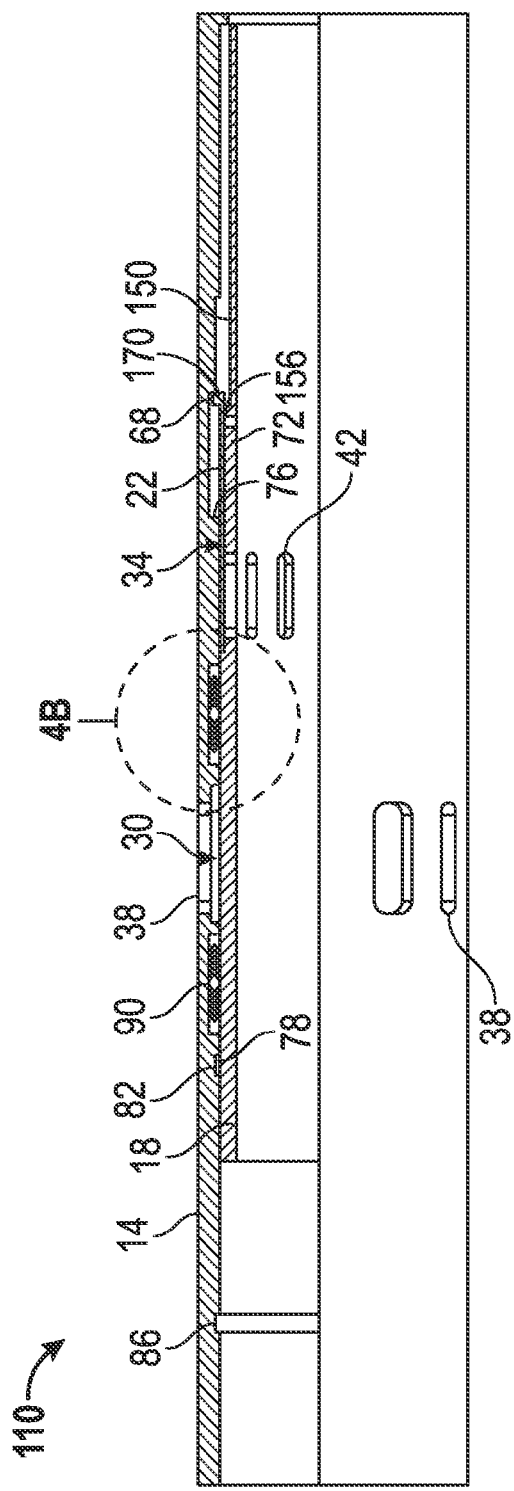
FIG. 4A depicts a partial cross sectional view of an alternate embodiment of the valve disclosed herein shown in a closed position.
Figure 4B:
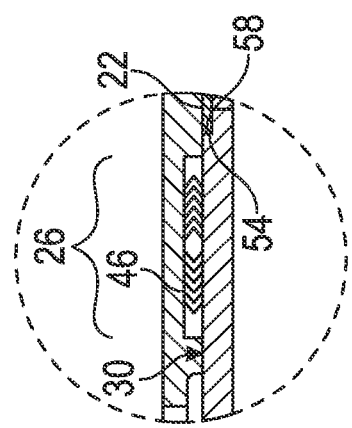
FIG. 4B depicts a magnified view of a portion of the valve of FIG. 4A taken at circle 4B.

Referring to FIGS. 4A and 4B, an alternate embodiment of a valve disclosed herein is illustrated at 110. The valve 110 employs many of the same components as the valve 10 and as such these components are depicted by the same reference characters. These components will not be described in detail again herein but instead the differences between the two valves 110, 10 will be elaborated on. Instead of using the biasing member 50 to bias the sleeve 22 against the shoulder 58 the valve 110 employs an interfering member 150 illustrated in this embodiment as a collet that is formed as a portion of the second tubular 18. The collet 150 includes fingers 156 that are biased radially outwardly such that the fingers 156 interferingly engage with the second end 72 of the sleeve 22 such that when the second tubular 18 is moved leftward in the Figures, the sleeve 22 also moves leftward. This arrangement assures that the sleeve 22 is positioned over the second ports 42 before the second ports 42 move longitudinally past the seal 26. The sleeve 22 is stopped from moving further leftward when the shoulder 68 on the sleeve 22 contacts the shoulder 76 on the first tubular 14. The fingers 156 of the collet 150 then flex radially inwardly as the second tubular 18 continues to move allowing the fingers 156 to slide along an inner surface 170 of the sleeve 22 until the second ports 42 longitudinally align with the first ports 38 resulting in an opening of the valve 110.

During closing of the valve 110 the sleeve 22 remains in its previous position by frictional engagement with the first tubular 14, for example, until the shoulder 58 of the second tubular 18 contacts the end 54 of the sleeve 22 thereby causing the sleeve 22 to move with the second tubular 18 from there on until the valve 110 is back to the fully closed position.

Figure 5:
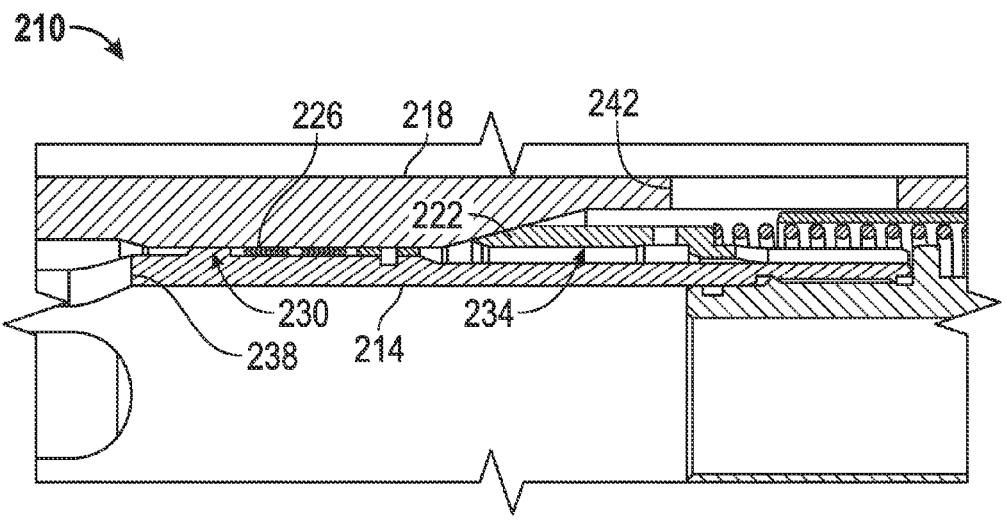
FIG. 5 depicts a partial cross sectional view of another valve disclosed herein in a closed position.
Figure 6:
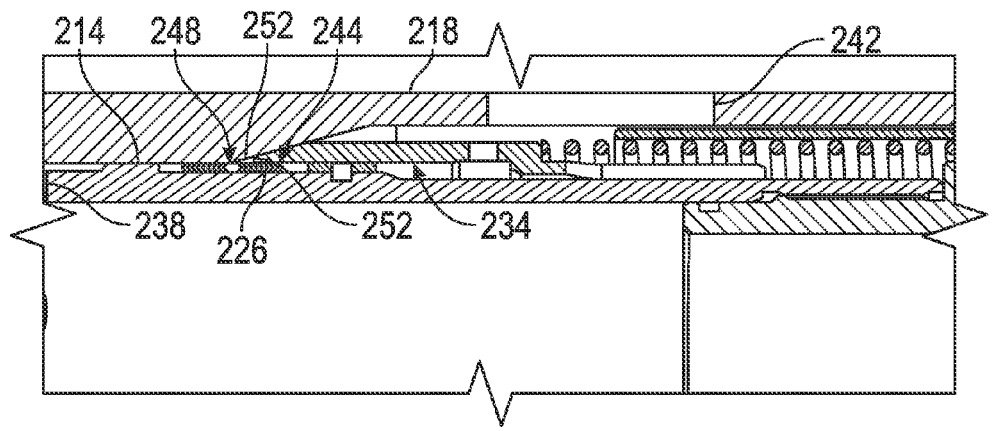
FIG. 6 depicts a partial cross sectional view of the valve of FIG. 5 in a closed position.
Figure 7:
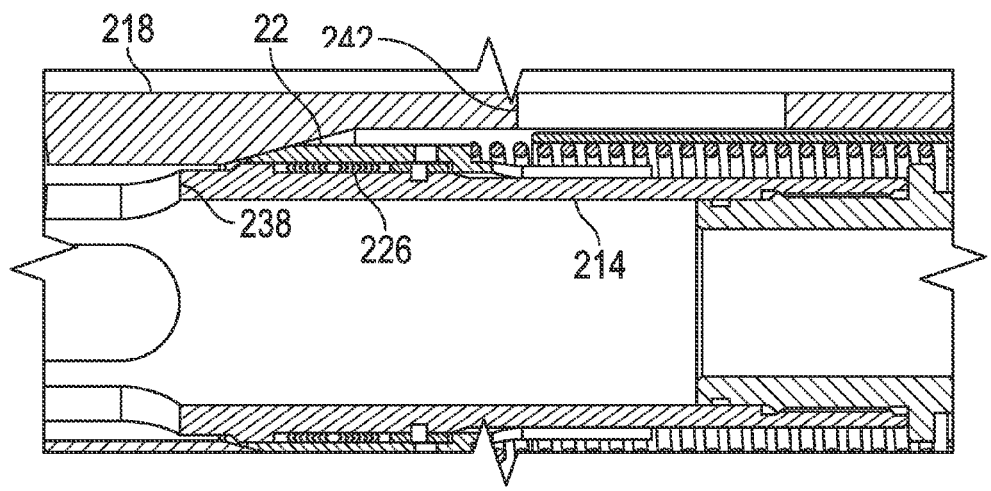
FIG. 7 depicts a partial cross sectional view of the valve of FIG. 5 in an alternate position.
Figure 8:
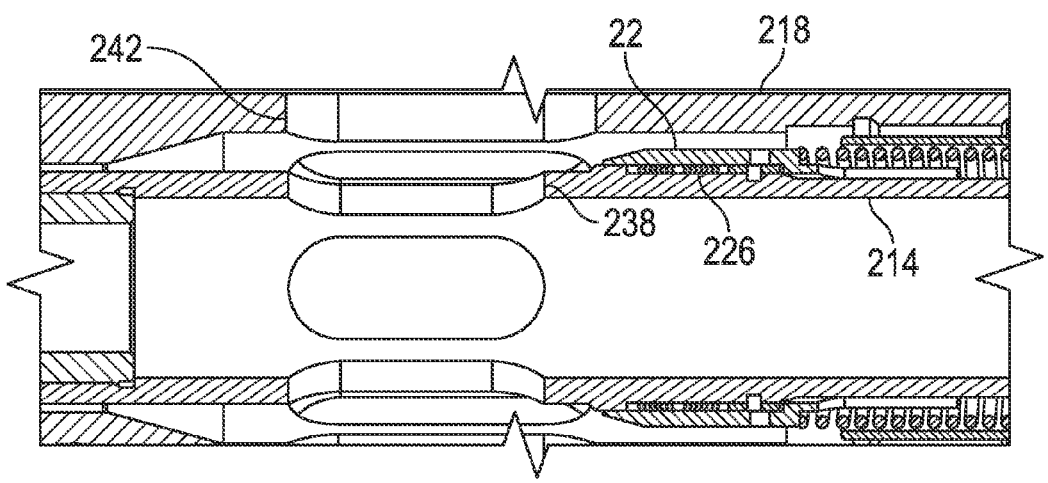
FIG. 8 depicts a partial cross sectional view of the valve of FIG. 5 in an open position.

Referring to FIGS. 5-8, an alternate embodiment of a valve disclosed herein as a tubular valve is illustrated at 210. The valve 210 includes a first member 214, a second member 218 movable relative to the first member 214 and a support member 222 movable relative to both the first member 214 and the second member 218 in an annular space defined between the first member 214 and the second member 218. The first member 214 and the second member 218 both being tubulars in this embodiment, and the support member 222 being a sleeve. A seal 226 is sealingly engaged with the first tubular 214 and slidably sealingly engaged with a sealing surface 230 of the second tubular 218. The valve 210 is configured such that when moving from a closed position, as shown in FIG. 5, to an open position, as shown in FIG. 8, a support surface 234 of the sleeve 222 first moves into supporting engagement with the seal 226, as shown in FIGS. 6 and 7, prior to the valve 210 opening. The foregoing structure assures that the seal 226 is always supported by either the sealing surface 230 or the support surface 234 at all possible positions of the tubulars 214, 218 and the sleeve 222. It should be noted that the support surface 234 is dimensioned substantially the same as the sealing surface 230 to minimize any changes in radial compression of the seal 226 as the sleeve 222 and the second tubular 218 move into and out of engagement with the seal 226. In fact, the seal 226 may sealingly engage with the support surface 234 upon engagement therewith.

The open versus closed position of the instant valve 210 is determined by the relative longitudinal positions of a first port 238 in the first tubular 214 and a second port 242 in the second tubular 218 relative to the seal 226. The closed position (FIG. 5) is defined by the second port 242 being on an opposite side of the seal 226 than the first port 238, while the open position (FIG. 8) is defined by the second port 242 being on a same side of the seal 226 as the first port 238. The open position allows fluidic communication between an inside and outside of the tubulars 214, 218.

Additionally, as best shown in FIG. 6, at least one of an end 244 of the sleeve 222 and a shoulder 248 of the second member 218 has a chamfer or radius 252 thereon to gradually load the seal 226 when the seal 226 moves between sliding engagement with the sealing surface 230 and sliding engagement with the support surface 234. This gradual loading of the seal 226 can further protect the seal 226 from damage that could occur if the seal 226 were to encounter a sharp edge while sliding between the sealing surface 230 and the support surface 234.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A valve comprising:
a first member having a first port therethrough;
a second member in operable communication with the first member and having a sealing surface thereon on an inner radial surface of the second member and a second port therethrough, the first member being movable relative to the second member;
a seal sealingly engaged with the first member and slidably sealingly engagable with the second member; and
a support member movably disposed relative to the first member and the second member having a support surface, the support member being movable with the second member relative to the first member so that upon movement of the second member relative to the first member the seal is continuously supported by at least one of the sealing surface and the support surface, while the seal is passing over the second port.

2. The valve of claim 1, wherein the seal is sealably engagable with the support surface.

3. The valve of claim 1, wherein the support member is biased relative to the second member thereby preventing formation of a longitudinal gap between the support surface and the sealing surface throughout relative movements between any of the first member, the second member and the support member.

4. The valve of claim 1, wherein a closed position of the valve is defined by the second port being on an opposite longitudinal side of the seal as the first port and an open position of the valve being defined by the second port being on a same longitudinal side of the seal as the first port.

5. The valve of claim 1, wherein the second member is movable relative to the first member a greater dimension than the support member to allow the first port to become misaligned with the support member during opening of the valve.

6. The valve of claim 1, wherein the first member is tubular, the second member is tubular and the support member is a sleeve.

7. A valve comprising:
a first member having a first port therethrough;
a second member in operable communication with the first member and having a sealing surface thereon and a second port therethrough, the first member being movable relative to the second member;
a seal sealingly engaged with the first member and slidably sealingly engagable with the second member; and
a support member movably disposed relative to the first member and the second member having a support surface, the support member being movable with the second member relative to the first member so that upon movement of the second member relative to the first member the seal is continuously supported by at least one of the sealing surface and the support surface, while the seal is passing over the second port, at least one of an end of the support surface and a shoulder of the sealing surface having a chamfer or radius thereon.

8. A valve comprising:
a first member having a first port therethrough;
a second member in operable communication with the first member and having a sealing surface thereon and a second port therethrough, the first member being movable relative to the second member;
a seal sealingly engaged with the first member and slidably sealingly engagable with the second member; and
a support member movably disposed relative to the first member and the second member having a support surface, the support member being movable with the second member relative to the first member so that upon movement of the second member relative to the first member the seal is continuously supported by at least one of the sealing surface and the support surface, at least one of an end of the support surface and a shoulder of the sealing surface having a chamfer or radius thereon wherein the chamfer or radius is configured to gradually load the seal when the seal slides between the sealing surface and the support surface.

9. A valve, comprising:
a first tubular having a first port and sealingly slidably surrounding a second tubular having a second port, the first tubular having a sealing surface on a first inner radial surface;
a sleeve positioned within an annular space defined between the first tubular and the second tubular being movable relative to the first tubular and the second tubular, the sleeve having a second inner radial surface; and
a seal sealably engaged with the second tubular and slidably sealably engagable with the sealing surface, the seal being movable relative to the first tubular and the sleeve by movement of the second tubular relative to the first tubular and the sleeve such that the seal is at least sealably engaged with the sealing surface or supported by the second inner radial surface at all locations of the second tubular relative to the first tubular and the sleeve including locations where the seal would pass over the second port.

10. A valve, comprising:

a first tubular having a first port and sealingly slidably surrounding a second tubular having a second port, the first tubular having a sealing surface on a first inner radial surface;

a sleeve positioned within an annular space defined between the first tubular and the second tubular being movable relative to the first tubular and the second tubular, the sleeve having a second inner radial surface; and a seal sealably engaged with the second tubular and slidably sealably engagable with the sealing surface, the seal being movable relative to the first tubular and the sleeve by movement of the second tubular relative to the first tubular and the sleeve such that the seal is at least sealably engaged with the sealing surface or supported by the second inner radial surface at all locations of the second tubular relative to the first tubular and the sleeve wherein the first port is in fluidic communication with the second port when the first port is on a same side of the seal as the second port and the first port is blocked from fluidic communication with the second port when the seal is sealing engaged with the sealing surface.

* * * * *